US009370966B2

United States Patent
Rathbone et al.

(10) Patent No.: US 9,370,966 B2
(45) Date of Patent: Jun. 21, 2016

(54) WHEEL-RIM PROTECTOR

(75) Inventors: Christopher Leonard Rathbone, Measham (GB); Curt John Rathbone, Studley (GB)

(73) Assignee: ALLOYGATOR LIMITED, Birmingham (GB)

(*) Notice: Subject to any disclaimer, the term of this patent is extended or adjusted under 35 U.S.C. 154(b) by 149 days.

(21) Appl. No.: 14/112,944

(22) PCT Filed: Apr. 19, 2012

(86) PCT No.: PCT/GB2012/050859
§ 371 (c)(1),
(2), (4) Date: Oct. 21, 2013

(87) PCT Pub. No.: WO2012/143720
PCT Pub. Date: Oct. 26, 2012

(65) Prior Publication Data
US 2014/0049095 A1 Feb. 20, 2014

(30) Foreign Application Priority Data

Apr. 20, 2011 (GB) .................................. 1106676.8

(51) Int. Cl.
*B60B 7/01* (2006.01)
*B60B 7/06* (2006.01)

(52) U.S. Cl.
CPC . *B60B 7/063* (2013.01); *B60B 7/01* (2013.01); *B60B 2900/212* (2013.01); *B60Y 2200/13* (2013.01)

(58) Field of Classification Search
CPC .............. B60B 7/01; B60B 7/06; B60B 7/02; B60B 7/00
USPC ............................. 301/37.101, 37.102, 37.24
See application file for complete search history.

(56) References Cited

U.S. PATENT DOCUMENTS 8,459,752 B2 * 6/2013 Russell .................... 301/37.102
2005/0012383 A1 * 1/2005 Hsieh ....................... 301/37.102
(Continued)

FOREIGN PATENT DOCUMENTS

GB      2393940       4/2004
GB      2397561       7/2004
(Continued)

OTHER PUBLICATIONS

International Search Report dated Aug. 21, 2012 for PCT Application No. PCT/GB2012/050859.
British Search Report dated Jul. 27, 2011 for GB Patent Application No. GB1106676.8.

*Primary Examiner* — Jason Bellinger
(74) *Attorney, Agent, or Firm* — A.C. Entis-IP Ltd.

(57) ABSTRACT

A wheel-rim protector comprises a flexible elongate body having first and second ends, wherein a lateral extent of the elongate body defines a rim-protection portion seatable on a rim edge of a wheel and a tail portion which extends away from the rim-protection portion seatable on a circumferential outer surface of the wheel rim. A connector which positively engages the first and second ends of the elongate body is also provided, and includes a toothed tongue element and a toothed-engagement element on a radially outer surface of the tail portion at or adjacent to at least one of the first and second ends. Teeth of the tongue element and the toothed-engagement element are interengagable to prevent or limit unintentional longitudinal separation of the first and second ends. The connector further includes an anti-lift element on or adjacent to the toothed-engagement element.

18 Claims, 3 Drawing Sheets

(56) References Cited

U.S. PATENT DOCUMENTS

2008/0018168 A1 1/2008 Conaway
2008/0252134 A1* 10/2008 Lunn .......................... 301/37.24
2011/0304196 A1* 12/2011 Dower ....................... 301/37.24

FOREIGN PATENT DOCUMENTS

| GB | 2421483 | 6/2006 |
|----|---------|--------|
| GB | 2456258 | 9/2009 |
| JP | 11278002 | 10/1999 |

* cited by examiner

US 9,370,966 B2

WHEEL-RIM PROTECTOR

RELATED APPLICATIONS

The present application is a US National Phase of PCT Application No. PCT/GB2012/050859, filed on Apr. 19, 2012, which claims the benefit under §119(a)-(d) of British Application of GB 1106676.8 filed on Apr. 20, 2011 the disclosure of which are incorporated herein by reference.

FIELD OF THE INVENTION

The present invention relates to a wheel-rim protector for a vehicle.

BACKGROUND OF THE INVENTION

A wheel-rim protector is known from GB2456258B. However, although this may be cut to length, development of suitable end fastening means which prevent or limit longitudinal separation, lateral displacement and/or skewing of the end portions relative to each other would be beneficial.

GB2397561A attempts to resolve this issue by utilising connection means. However, the suggested arrangement is deficient and unsuitable. FIGS. 5 and 6 show two embodiments of connection means. Both embodiments are provided on the outer head or rim-protection portion. A release hole is provided for releasing the two engaged parts. This may over time become blocked with dirt and other particulate matter, and furthermore may unintentionally cause release due to the forced ingress of dirt. Additionally, the provision of the release hole on the visible rim-protection portion is aesthetically not ideal. If the connection means is not provided on the visible rim-protection portion, then the release of the engaged ends becomes problematic due to access issues caused by the tyre. Furthermore, and particularly in the FIG. 5 embodiment, the male toothed portion can slide laterally, causing unintentional disengagement.

BRIEF SUMMARY OF THE INVENTION

The present invention seeks to provide a solution to these problems.

According to the invention, there is provided a wheel-rim protector comprising a flexible elongate body having first and second ends, a lateral extent of the elongate body defining a rim-protection portion seatable on a rim edge of a wheel rim and a tail portion which extends away from the rim-protection portion seatable on a circumferential outer surface of the wheel rim, and a connector for positively engaging the first and second ends of the elongate body, the connector including a toothed tongue element and a toothed tongue-engagement element on a radially outer surface of the tail portion at or adjacent to at least one of the first and second ends, the teeth of the tongue element and the tongue-engagement element being interengagable to prevent or limit unintentional longitudinal separation of the first and second ends, the connector further including an anti-lift element on or adjacent to the tongue-engagement element for preventing or limiting unintentional lift off of the tongue element when seated on the tongue-engagement element.

A wheel has a rim, a tyre mounted on the rim, and a wheel-rim protector in accordance with the first aspect of the invention and provided on an outer edge of the rim.

BRIEF DESCRIPTION OF THE SEVERAL VIEWS OF THE DRAWINGS

The invention will now be more particularly described, by way of example only, with reference to the accompanying drawings, in which.

DETAILED DESCRIPTION OF THE INVENTION

Figure 1:
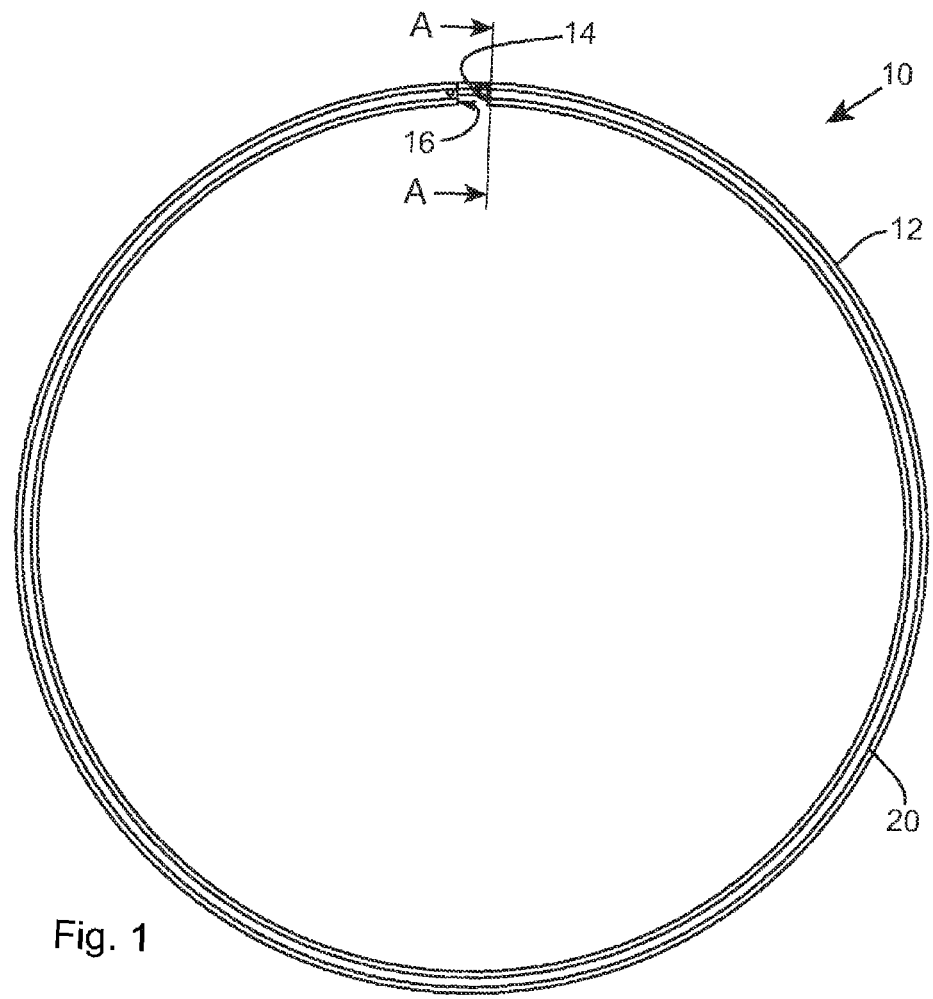
FIG. 1 shows a plan view of an arcuate wheel-rim protector, in accordance with the invention and with first and second ends spaced apart.

Referring to the drawings, there is shown a first embodiment of a wheel-rim protector 10 which comprises a flexible elongate body 12 having first and second ends 14, 16, and a connector 18 for positively engaging the first and second ends 14, 16.

The elongate body 12 is arcuate so that, when the first and second ends 14, 16 are interconnected, an annulus or ring is formed. The elongate body 12 is preferably formed of moulded or extruded plastics, and includes a rim-protection head portion 20 defining a longitudinal front or proximal edge 22, and a tail portion 24 defining a longitudinal rear or distal edge 26.

The head portion 20 is generally hook-shaped so as to be seatable on a rim of a wheel. Preferably, the head portion 20 overlies an outer rim edge, and includes two oppositely chamfered outer surfaces 28 to provide a generally triangular lateral cross-section. This provides greater protection during impact, and also allows the head portion 20 to project axially further outwards when in use.

The tail portion 24 is offset relative to a centreline of the head portion 20, so that in use the head portion 20 extends over the rim of the wheel more than the tyre. This is beneficial since, on impact, there is likely to be a lesser moment applied about the junction between the head portion 20 and the tail portion 24, thereby leading to less risk of permanent damage and/or separation of the rim protector 10 from the wheel.

The tail portion 24 is thinner than the head portion 20 in an in use radial direction, but has a greater in use axial extent. The tail portion 24 preferably tapers from the head portion 20 to its distal edge 26, and preferably has an arcuate lateral extent.

The lateral extent of the tail portion 24 is sufficient so that it can be received between a wheel rim and its tyre mounted thereon. Preferably, the tyre seats on the tail portion 24, thereby clamping it securely to the circumferential outer surface of the wheel rim. However, it may be possible to utilise other engagement means as an alternative or additionally in order to secure the tail portion 24 to the circumferential outer surface of the wheel rim. For example, adhesive can be considered.

The connector 18 includes a toothed tongue element 32 integrally formed as one-piece at the tail portion 24 so as to extend from the first end 14 of the elongate body 12, a toothed tongue-engagement element, being in this case preferably an engagement bed 34, on a radially outer surface 36 of the tail portion 24, at or adjacent to the second end 16 of the elongate body 12, an anti-lift element 38 and an anti-skew element 40.

The tongue element 32 is elongate and includes a plurality of teeth 42 on its underside. The tongue element 32 has an arcuate lateral extent to match or substantially match the curvature of the tail portion 24, and an arcuate longitudinal extent to match or substantially match the curvature of the longitudinal extent of the elongate body 12. The teeth 42 are also preferably arcuate along their longitudinal extents to match or substantially match the radius of curvature of the lateral extent of the tongue element 32. Beneficially, the teeth 42 are at or adjacent to the distal end 44 of the tongue element 32, and extend partway along the longitudinal extent.

In this embodiment, the teeth 42 of the tongue element 32 do not extend fully across the lateral extent of the underside of the tongue element 32. A first runner 46, forming part of the anti-skew element 40, extends longitudinally along the underside of the tongue element 32, at or adjacent to a tail edge 48 of the tongue element 32. See FIGS. 3 and 4.

A second runner 50, forming part of the anti-lift element 38, extends longitudinally along the head edge 52 of the tongue element 32. The second runner 50 projects laterally from the head edge 52 of the tongue element 32 in an in use axial direction. See FIG. 4.

The engagement bed 34 extends longitudinally on the elongate body 12, and is preferably recessed into the tail portion 24. The engagement bed 34 is longitudinally arcuate to follow the radius of the elongate body 12, and laterally arcuate to follow the curvature of the tail portion 24. Teeth 54 are provided along all or at least a majority of the longitudinal extent of the engagement bed 34, and the bed 34 preferably extends from the second end 16 of the elongate body 12.

As with the teeth 42 of the tongue element 32, the teeth 54 of the engagement bed 34 have an arcuate longitudinal extent. Preferably, the two sets of teeth 42, 54 are serrated and oriented to face backwards, thereby providing a ratchet-like engagement therebetween. This promotes sliding engagement of the tongue element 32 with the engagement bed 34 during introduction, but prevents or limits separation in the longitudinal direction of the elongate body 12.

An open-top channel 56, forming a further part of the anti-skew element 40, is provided at or adjacent to a longitudinal tail edge 58 of the engagement bed 34. The open-top channel 56 is preferably complementarily shaped to receive the first runner 46 as a close fit. Typically, the first runner 46 is introduced into the open-top channel 56 during engagement of the teeth 42 of the tongue element 32 with the teeth 54 of the engagement bed 34. This introduction may be by sliding or folding the tongue element 32 down onto the teeth 54 and thus the first runner 46 through the open top of the channel 56.

With the first runner 46 and the open-top channel 56 engaged, the rotational or skewing movement of the tongue element 32 on the engagement bed 34 in a generally axial direction is prevented or limited.

An undercut 60, forming a further part of the anti-lift element 38, is provided in a longitudinal head edge 62 of the engagement bed 34. See FIG. 4. The undercut 60 is an elongate slot or recess preferably extending from the second end 16 of the elongate body 12. The second runner 50 is complementarily shaped to slide or slot into the undercut 60 as the toothed tongue element 32 engages with the toothed engagement bed 34. Due to the undercut 60 projecting laterally of the elongate body 12, the second runner 50 when received therein prevents or limits uplift of the tongue element 32 away from the engagement bed 34.

Figure 5:
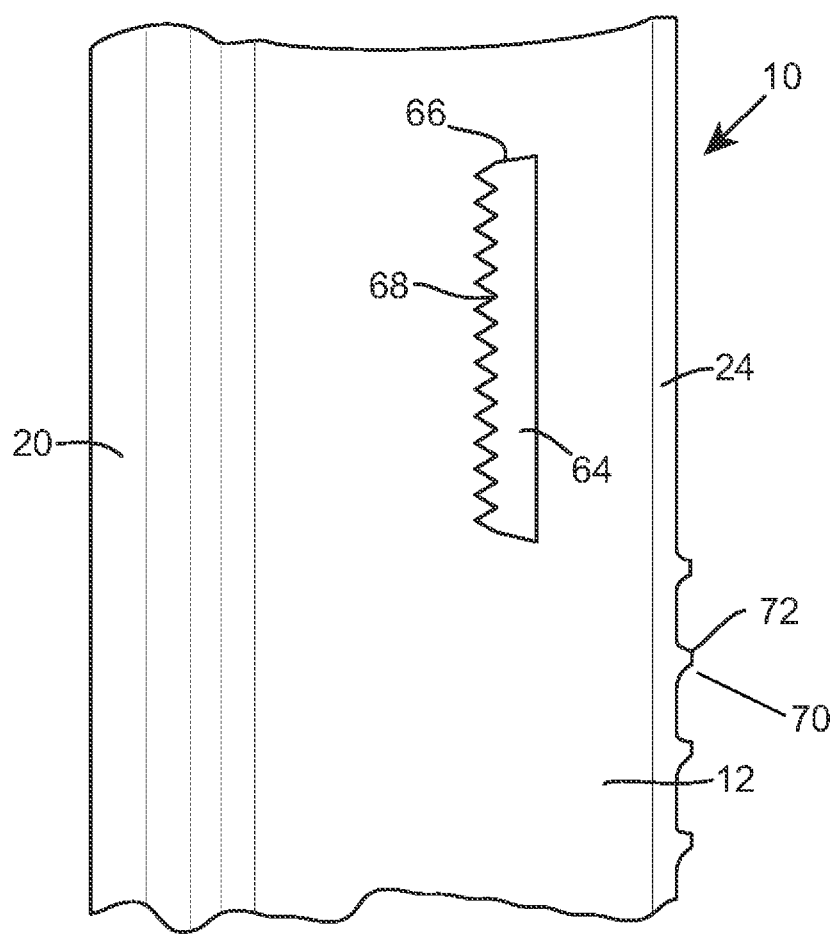
FIG. 5 is an underside plan view of part of the wheel-rim protector showing a recess of a gripping element formed in a tail portion.

To promote further engagement of the elongate body 12 with a circumferential outer surface 36 of a wheel rim, a plurality of gripping elements 64 is also provided in spaced relationship along an underside of the tail portion 24. Each gripping element 64 includes a recess 66 formed in the underside of the tail portion 24, and a toothed member 68 which slots into the recess 66. The recess 66, as best seen in FIG. 5, is oriented to direct the toothed member 68 at an angle towards the rim-protection head portion 20.

The toothed member 68 is preferably a row of longitudinally aligned metal teeth. However, other materials could be considered providing they are sufficiently resilient.

Figure 2:
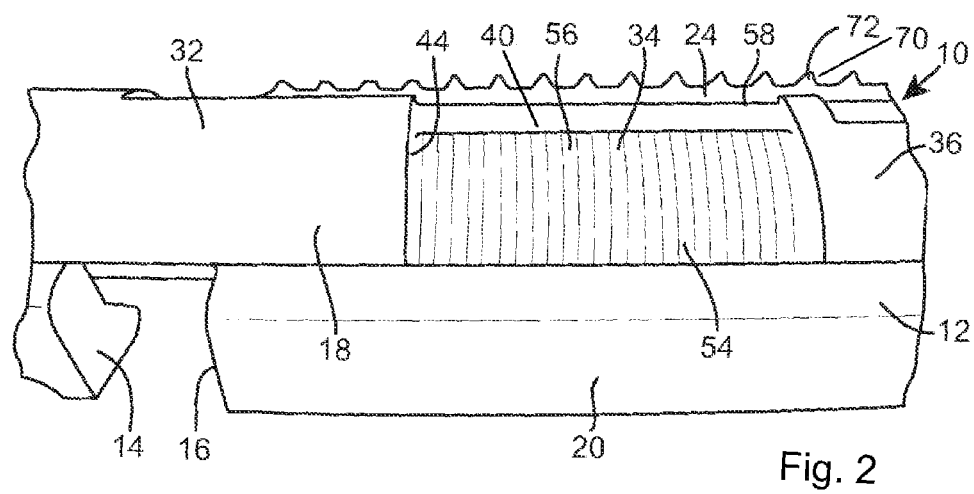
FIG. 2 is an enlarged, generally plan, view of a connector of the wheel-rim protector at the first and second ends.
Figure 3:
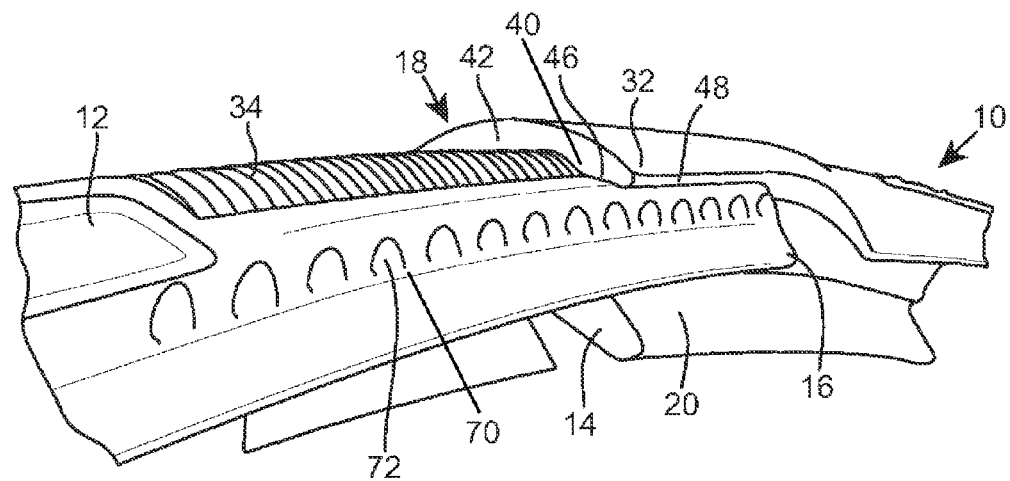
FIG. 3 is an enlarged view similar to that of FIG. 2, in a generally longitudinal direction along a distal edge of a tail portion of the wheel-rim protector, and again showing the connector.
Figure 4:
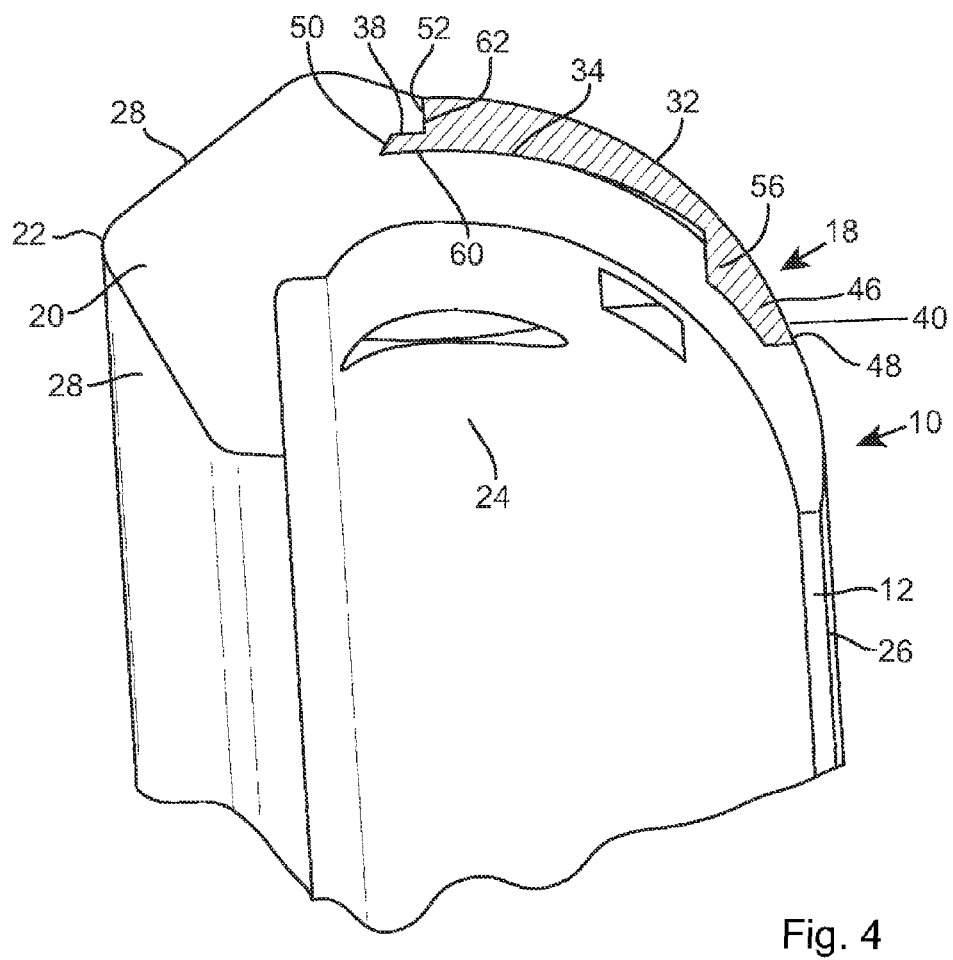
FIG. 4 is a lateral cross-sectional view from the underside along line A-A in FIG. 1, showing a tongue element of the connector engaged with an engagement bed.

As also seen in FIGS. 2 and 3, an additional gripping element 70 may also be provided on the upper surface of the tail portion 24, on or adjacent to its distal edge. The additional gripping element 70 is preferably integrally formed as one-piece with the tail portion 24, and includes a row of longitudinally aligned teeth 72. In use, the teeth 72 bite into the material of the tyre, further retaining the elongate body 12 in place.

The additional gripping element may be provided as a plurality of spaced apart portions along the longitudinal extent of the elongate body, or may be continuously formed along the elongate body.

Similarly, the first said gripping element may be alternatively formed as a continuous strip along at least a majority of the longitudinal extent of the underside of the tail portion.

It may be feasible to dispense with the anti-skew element. Furthermore, although the anti-lift element and the anti-skew element are spaced apart on opposite sides of the connector, they could be integrated together. For example, an undercut could be provided on the longitudinal head edge and tail edge of the engagement bed, thereby preventing or limiting lift as well as skew.

Although the undercut of the anti-lift element is preferably provided on the engagement bed, it could be provided on the tongue element with the associated runner thereby being provided on the engagement bed.

Similarly, the open-top channel of anti-skew element on the engagement bed may be provided as an open-bottom channel on the tongue element, whereby the associated runner is provided on the engagement bed.

Although the tongue element is integrally formed as one-piece on the first end of the elongate body, it may be a separate piece. In this case, a said engagement bed is formed at both first and second ends, and the tongue element includes teeth at both of its ends.

To additionally or alternatively prevent or limit lift, a bridging element may be provided at or adjacent to the leading end of the engagement bed, which extends laterally thereacross and which is at or adjacent to the end of the elongate body. The bridging element includes a space there beneath sufficient to allow the tongue element to slide into engagement with the engagement bed.

It is thus possible to provide a wheel-rim protector which includes a connector for interconnecting the ends. The connector provides longitudinal restraint against separation of the two ends, as well as preventing or limiting disengagement through lifting apart and skewing.

The embodiments described above are provided by way of examples only, and further modifications will be apparent to persons skilled in the field without departing from the scope of the invention as defined by the appended claims.

The invention claimed is:

1. A wheel-rim protector comprising:
   a flexible elongate body having first and second ends,
   a lateral extent of the elongate body defining a rim-protection portion seatable on a rim edge of a wheel rim and a tail portion which extends laterally away from the rim-protection portion seatable on a circumferential outer surface of the wheel rim,
   and a connector which positively engages the first and second ends of the elongate body,
   the connector including a toothed tongue element and a toothed engagement element on a radially outer surface of the tail portion at or adjacent to at least one of the first and second ends,
   the teeth of the tongue element and the toothed-engagement element being interengagable to prevent or limit unintentional longitudinal separation of the first and second ends,
   the connector further including an anti-lift element on or adjacent to the toothed-engagement element which prevents or limits unintentional lift off of the tongue element when seated on the toothed-engagement element.

2. The wheel-rim protector as claimed in claim 1, wherein the connector further includes an anti-skew element on or adjacent to the toothed-engagement element which prevents or limits unintentional skewing of the tongue element when seated on the toothed-engagement element.

3. The wheel-rim protector as claimed in claim 2, wherein the anti-skew element is spaced from the anti-lift element.

4. The wheel-rim protector as claimed in claim 2, wherein the anti-skew element includes a longitudinal open-top channel extending along the side of the toothed-engagement element, and a longitudinal projecting runner extending along the tongue element.

5. The wheel-rim protector as claimed in claim 4, wherein the open-top channel is at or adjacent to the distal edge of the tail portion remote from the rim-protection portion.

6. The wheel-rim protector as claimed in claim 1, wherein the anti-lift element includes a longitudinal undercut along at least one side of the toothed-engagement element to slidably receive a respective edge of the tongue element to prevent or limit lifting of the tongue element away from the toothed-engagement element.

7. The wheel-rim protector as claimed in claim 1, wherein the anti-lift element includes a bridge at or adjacent to an end of the toothed-engagement element, the tongue element being feedable under the bridge to engage with the toothed-engagement element.

8. The wheel-rim protector as claimed in claim 1, wherein the tongue element and the toothed-engagement element include a plurality of teeth.

9. The wheel-rim protector as claimed in claim 1, wherein the tongue element is flush with an outer surface of the tail portion.

10. The wheel-rim protector as claimed in claim 1, wherein the tongue element is integrally formed as one-piece with the elongate body, so as to project from one of the first and second ends.

11. The wheel-rim protector as claimed in claim 1, wherein the teeth of the tongue element and the toothed-engagement element extend laterally of the elongate body.

12. The wheel-rim protector as claimed in claim 1, wherein a lateral extent of at least one of the outer and inner surfaces of the tongue element and the toothed-engagement element is arcuate.

13. The wheel-rim protector as claimed in claim 1, wherein a lateral extent of the tail portion is greater than the lateral extent of the tongue element.

14. The wheel-rim protector as claimed in claim 1, further comprising a gripping element on an underside of the tail portion.

15. The wheel-rim protector as claimed in claim 14, wherein a plurality of said gripping elements is provided in spaced relationship along the longitudinal extent of the elongate body.

16. The wheel-rim protector as claimed in claim 1, further comprising an additional gripping element on an upper surface of the tail portion, on or adjacent to a distal edge thereof remote from the rim-protection portion.

17. The wheel-rim protector as claimed in claim 16, wherein the additional gripping element includes a toothed element integrally formed as one-piece with the tail portion.

18. The wheel-rim protector as claimed in claim 1, wherein the rim-protection portion is adapted to extend axially beyond the rim of the wheel.

* * * * *